United States Patent Office 3,278,631
Patented Oct. 11, 1966

3,278,631
PRODUCTION OF ETHYLENE
Robert L. Hartnett, Texas City, and Lawrence J. Hughes, Hitchcock, Tex., assignors to Monsanto Company, St. Louis, Mo., a corporation of Delaware
No Drawing. Filed May 21, 1964, Ser. No. 369,285
18 Claims. (Cl. 260—683.3)

This invention relates to an improved process for the production of olefins from saturated hydrocarbons. More particularly, it relates to the production of ethylene from ethane.

It is well known that olefins can be obtained by thermal decomposition of petroleum-derived hydrocarbons. Ethylene can be obtained, for example, by thermal conversion of light saturated hydrocarbons such as ethane and/or propane. However, in such a process, the gaseous conversion product contains, in addition to the desired ethylene, significant amounts of other products such as methane, propylene, acetylene, butenes and the like. In order to recover the ethylene in sufficiently pure form for its utilization, the gaseous thermal conversion product must be processed by fractionation in a series of steps requiring fairly elaborate equipment and time consuming operations. Furthermore, non-gaseous hydrocarbons such as oils and tars and normally cyclic hydrocarbons are formed simultaneously with the ethylene. Provision must be made for removal of such contaminants because they lead to fouling of the apparatus and equipment. Thus, despite the extensive studies which have been made on cracking of light hydrocarbons to produce ethylene, there are still some disadvantages in commercial production by this method.

Some of the problems inherent in the production of ethylene by cracking techniques can be obviated by producing this hydrocarbon in a relatively pure state by catalytic dehydrogenation of ethane. However, the art has thus far failed to provide a continuous process for the dehydrogenation of ethane to ethylene which is not subject to a number of drawbacks. Known catalysts for the dehydrogenation suffer from deficiences in that they either result in low conversion to dehydrogenation products or to low yields of ethylene or are deficient in both respects. Prior art catalysts, too, become readily fouled with carbon deposits which render them ineffective in the dehydrogenation process and necessitate frequent and sometimes expensive regeneration. The advantages of a process wherein conversion of ethane to ethylene can be effected with fewer operational steps and less by-product formation are, therefore, immediately obvious.

It is an object of the present invention to provide a process wherein ethane can be readily converted to ethylene in a relatively simple process and with comparatively little loss to non-useful by-products. Other objects and advantages of the invention will become apparent from the following description.

According to the present invention, a mixture of ethane, hydrogen chloride and oxygen or air is contacted at an elevated temperature with a siliceous material as a catalyst to produce an effluent gas mixture from which ethylene can be recovered in good yield. Only small amounts of chlorinated by-products are produced which are readily separable from ethylene, fewer steps are required for recovery of the ethylene, and the hydrogen chloride produced can be continuously recycled in the process. As employed in the present specification and claims, the term "siliceous material" is defined as including the various forms of silica such as silica gel, quartz, sand, diatomaceous earth and the like; metal silicates such as iron, cobalt, nickel, and manganese silicates and the like; silica minerals or mineral silicates such as pumice, garnets, zircons, micas, and the like; and mixtures of these substances. Particularly, preferred at catalysts in the practice of the invention are iron silicate, either used alone or supported on another siliceous material such as silica gel and mineral silicates of the iron garnet group, especially that variety commonly known as andradite.

The invention is illustrated in the following examples which, however, are not to be construed as limiting it in any manner whatsoever.

EXAMPLE 1

An iron silicate catalyst was prepared as follows. About 500 ml. of an aqeuous solution of 40% sodium silicate was diluted with 2 liters of water and 50 g. of ferric chloride dissolved in 100 ml. of water was added with stirring to this solution. The precipitate which formed was allowed to settle for about an hour and was then washed by decantation. The decanted slurry was dried at 85° C. and 30 mm. Hg and the dried product was screened to recover material in the 40–100 mesh size.

The catalyst (500 ml.) was charged to a tubular glass reactor about 4 ft. long and 40 mm. in diameter wrapped with Nichrome wire for heating and covering with asbestos insulation. A thermowell containing a thermocouple for measuring temperatures was centrally positioned in the reactor extending throughout its length. The catalyst was fluidized by passing nitrogen up through it while the reactor was brought up to reaction temperature. Thereafter, ethane, hydrogen chloride and oxygen at approximate rates of 0.024, 0.055, and 0.027 S.C.F.M., respectively, to provide an approximate mole ratio of 1:2:1 were passed successively through rotameters into a mixing manifold and then into the bottom of the reactor where they were contacted with the fluidized catalyst maintained at a temperature within the range from about 400 to about 550° C. As the reactants were introduced, the flow of nitrogen was proportionately reduced so that the velocity of the entering gaseous reactants helped to maintain the catalysts in the fluidized state.

Effluent gases from the top of the reactor were passed through a separator filled with glass wool for removal of any entrained catalyst particles and thence into a series of Dry Ice traps. Analyses of both the vapor phase and liquid products were made by gas chromatographic means. Calculations based on the data obtained showed a total ethane conversion at about 540° C. of 79.5%, a conversion to ethylene of 27.3% and a yield of ethylene of 34.3%.

EXAMPLE 2

The experiment of Example 1 was repeated with ethane, hydrogen chloride, and oxygen being fed at rates of 0.042, 0.049 and 0.022 S.C.F.M., respectively, to provide an approximate mole ratio of 1:1:0.5 and a contact time of 3.3 seconds. The reaction temperature in this run was maintained at about 540 to 545° C. Total conversion of ethane was 70.5%, conversion to ethylene was 36.3%, and yield of ethylene was 51.5%.

EXAMPLE 3

A catalyst consisting of 10% iron silicate on silica gel was prepared by mixing 64 g. of ferric chloride dissolved in water with 1000 g. of silica gel (40–100 mesh) and adding to the resulting slurry 90 g. of a 40% aqueous solution of sodium silicate and additional water while stirring the mass continuously. After washing with water and decanting, the resulting slurry was dried on a rotary evaporator.

About 1000 g. of the iron silicate supported on silica prepared in the foregoing manner was charged to a tubular reactor about 6 ft. long and 60 mm. in diameter wrapped with Nichrome wire for heating and covered with asbestos insulation. A thermowell containing thermocouples for measuring temperatures was centrally positioned in the reactor extending throughout its length. The catalyst was fluidized by passing nitrogen up through it while the reactor was brought up to reaction temperature. Thereafter, hydrogen chloride and oxygen at approximate rates of 0.116 and 0.0385 S.C.F.M. respectively, were passed through rotameters into a common manifold where they were mixed and from which they were then introduced into the bottom inlet of the reactor to contact the fluidized catalyst maintained at a temperature from about 500° C. to about 600° C. Ethane, at a rate of about 0.116 S.C.F.M., was fed separately through a rotameter and injected simultaneously into the fluidized catalyst in the reactor at a point about 6 inches above the bottom inlet. As the reactants were introduced, the flow of nitrogen was appropriately reduced so that the velocity of the entering gaseous reactants helped to maintain the catalyst in the fluidized state.

Effluent gases from the top of the reactor were passed directly into a vapor-phase gas chromatograph for analysis. From the analysis of the reaction product collected at various temperature levels, total conversion of ethane, conversion of ethane to ethylene, and yield of ethylene were calculated. These are presented in Table 1 below.

*Table 1*

| Temperature, °C. | Total $C_2H_6$ Conv., Percent | Conv. to $C_2H_4$, Percent | Yield of $C_2H_4$, Percent |
|---|---|---|---|
| 530 | 43.7 | 37.8 | 87 |
| 550 | 46.1 | 41.5 | 89 |
| *575 | 51.5 | 47.0 | 91.5 |
| *600 | 54.5 | 50.5 | 93 |

*Ethane injection point 5 inches above bottom inlet.

EXAMPLE 4

The reactor of Example 3 was charged with 2000 g. of a garnet identified and made available commercially as "C" grade Florida garnet by Continental Mineral Processing Corp. of Cincinnati, Ohio. Based on its chemical analysis, this was a common garnet of the iron group known as andradite. The catalyst was fluidized and the reactor brought up to reaction temperature as described in Example 3. Thereafter, as in the previous example, hydrogen chloride and oxygen were fed to the reactor at rates of about 0.1345 and 0.0445 S.C.F.M. respectively, while ethane was injected into the reactor at a point 5 inches above the inlet of the other reactants at a rate of 0.1345 S.C.F.M. Reaction temperature was maintained between about 500 and 600° C. Conversions and yields obtained at the various temperatures using this catalyst are presented in Table 2 below.

*Table 2*

| Temperature, °C. | Total $C_2H_6$ Conv., Percent | Conv. to $C_2H_4$, Percent | Yield of $C_2H_4$, Percent |
|---|---|---|---|
| 510 | 32.8 | 26.0 | 80 |
| 550 | 43.3 | 37.0 | 85.5 |
| 575 | 49.5 | 42.5 | 86 |
| 600 | 45.8 | 39.0 | 85.2 |

EXAMPLE 5

The experiment of Example 4 was repeated except that the ethane was injected into the catalyst at a point about 7 inches above the inlet of the other reactants. Results under these conditions differ little from those in Example 4 as can be seen from the following data obtained.

*Table 3*

| Temperature, °C. | Total $C_2H_6$ Conv., Percent | Conv. to $C_2H_4$, Percent | Yield of $C_2H_4$, Percent |
|---|---|---|---|
| 525 | 41 | 32.7 | 80 |
| 550 | 47.3 | 38.8 | 82 |
| 575 | 49.0 | 41.5 | 85 |

EXAMPLE 6

Ethane, hydrogen chloride and oxygen in a mole ratio of 1:1:0.5 were reacted in contact with 1000 g. of pumice as a catalyst at a temperature in the range from about 400 to about 650° C. using the reactor of Example 3 and following the procedure described therein. Total conversions of ethane, conversion of ethane to ethylene, and yields of ethylene at various temperature levels are presented in Table 4 below.

*Table 4*

| Temperature, °C. | Total $C_2H_6$ Conv., Percent | Conv. to $C_2H_4$, Percent | Yield of $C_2H_4$, Percent |
|---|---|---|---|
| 520 | 17.5 | 4.5 | 26 |
| 550 | 31.0 | 13.5 | 43.5 |
| 605 | 40.0 | 24 | 60 |
| *615 | 45.5 | 30.0 | 67 |
| *625 | 47.5 | 37.5 | 79 |

*Oxygen feed reduced by 25%.

EXAMPLE 7

The experiment of Example 6 was repeated with 1000 g. of beach sand (<60 mesh) being substituted for pumice as the catalyst. Results are presented in Table 5.

*Table 5*

| Temperature, °C. | Total $C_2H_6$ Conv., Percent | Conv. to $C_2H_4$, Percent | Yield of $C_2H_4$, Percent |
|---|---|---|---|
| 520 | 31.3 | 14.7 | 47.0 |
| 560 | 33.0 | 22 | 66.6 |
| 585 | 35 | 30 | 86 |

EXAMPLE 8

The experiment of Example 6 was again repeated with 1000 g. of a calcined diatomaceous earth marketed under the trade name "Chromosorb (Red)" by Johns Manville Corp. substituted for pumice as the catalyst. Temperatures in the range from 500° to 600° C. were used. Results are presented in Table 6 below.

*Table 6*

| Temperature, °C. | Total $C_2H_6$ Conv., Percent | Conv. to $C_2H_4$, Percent | Yield of $C_2H_4$, Percent |
|---|---|---|---|
| 520 | 29.5 | 15.0 | 51 |
| 550 | 32.5 | 25.5 | 78.5 |
| 570 | 47.5 | 26.5 | 71.0 |

EXAMPLE 9

Following the procedure of Example 6, ethane, HCl and oxygen were fed to the reactor described in that example in the same mole ratio used therein but in contact with 1000 g. of silica gel as a catalyst (manufactured by Girdler Catalysts Department of Chemetron Chemicals, a Division of Chemetron Corporation under the trade designation T-869). Reaction temperature was maintained in the range from 400 to 600° C. Data calculated from results of analyses of the reaction product collected at various reaction temperatures are presented in Table 7 below.

*Table 7*

| Temperature, °C. | Total C₂H₆ Conv., Percent | Conv. to C₂H₄, Percent | Yield of C₂H₄, Percent |
| --- | --- | --- | --- |
| 500 | 46.5 | 33.5 | 72.0 |
| 560 | 53.5 | 38.5 | 72.0 |
| 575 | 55.0 | 40.0 | 73.0 |
| 590 | 57.2 | 40.7 | 71.1 |

The foregoing examples clearly demonstrate that ethylene can be produced in excellent yields from ethane by reacting the ethane with hydrogen chloride and air or oxygen in contact wtih either a siliceous material alone or a mixture of siliceous materials.

It is readily apparent that various modifications of the reaction conditions given in the examples can be made without departing from the scope of the invention. In the preferred embodiment of the invention, the catalyst is employed in the fluidized or pseudo liquid state. It is maintained in a fluid or suspended state by the gaseous reactants themselves or, optionally, by the use of an additional inert gas introduced from an outside source. The use of a fixed bed operation, however, is not precluded.

The siliceous catalysts of the process are, in general, readily available either as naturally occurring materials or as synthetic products which can be obtained commercially or can be prepared easily. Iron silicate, for example, can be prepared by reacting an aqueous solution of a soluble silicate such as sodium silicate with an aqueous solution of a soluble salt or iron such as iron chloride, iron nitrate, iron sulfate or the like. The supernatant liquid is removed and the residual salt is washed away from the precipitated iron silicate by successive slurrying with water and decanting or any other common washing technique. After washing, the slurry is dried by conventional means such as in a rotary drier or vacuum evaporator and broken up into particle sizes suitable for fluidization. When it is desired to use the iron silicate catalyst on a support, the support is saturated with an aqueous solution of a soluble iron salt and the solution of the soluble silicate is added to the resulting slurry. Alternatively, the support can be saturated with the solution of the soluble silicate and the solution of the soluble iron salt added to the resulting slurry. The first method mentioned, however, is the preferred one because it provides for more intimate dispersion of the silicate on the support. Suitable supports include materials such as silica gel, pumice, kieselguhr, fuller's earth and like substances. The other metallic silicates hereinbefore disclosed as suitable can be prepared in an analogous manner. Generally, amounts of the iron or other metal silicates ranging from about 1 to about 15% by weight of the total composition are deposited upon the support. Preferred catalyst compositions contain from about 5% to about 10% by weight of iron silicate or other metal silicate.

The preferred method of introducing the reactants is that which is exemplified, that is, the hydrogen chloride and oxygen are introduced into the bottom of the reactor while ethane is injected at a point somewhat above the bottom inlet point. The point of ethane injection is suitably located at a distance of from about 5% to about 20% of the reactor length above the inlet of the other reactants. Optimum results are obtained with the ethane being injected at a point from about 7% to about 10% of the reactor length above the bottom inlet. The reaction may be carried out by mixing the ethane, hydrogen chloride and oxygen or air and passing the mixture into the reactor, or by introducing air or oxygen into a mixture of ethane and hydrogen chloride. These latter methods are, however, much less satisfactory than the preferred one. Precaution should be taken to avoid mixing ethane and oxygen in the absence of hydrogen chloride to prevent creation of possible hazardous conditions.

As is evident from the examples, the relative proportions of the reactants may vary considerably. Ratios of ethane to hydrogen chloride to oxygen varying from 1:0.5:0.2 to 1:2:1 can be used. It is understood that the oxygen for the reaction may, of course, be supplied in the form of air and when air is used, the mole ratio of ethane to hydrogen chloride to air may vary from 1:0.5:1 to 1:2:5. Preferably, the mole ratio when oxygen is employed is maintained at about 1:1:0.3 and correspondingly at 1:1:1.5 when air is used. Since little hydrogen chloride is consumed in the reaction, only very small amounts, if any, of hydrogen chloride need be fed once the reaction has been initiated if provision is made by recycle of the hydrogen chloride.

Contact time is not a critical variable and may vary from about 1 to about 30 seconds. Preferably, contact times from about 5 to about 20 seconds are used.

Reaction temperature is a critical factor. The temperature must be maintained above about 400° C. to effect the reaction. Generally, a suitable temperature range for the reaction is from 500 to 650° C. At too high temperatures, carbon begins to deposit on the catalyst. Preferably, the temperature of the reaction is maintained from about 550° C. to about 600° C.

The process is preferably carried out at atmospheric pressure. Either superatmospheric or subatmospheric pressures can be employed, however, although no advantages seem to be gained by their use.

What is claimed is:

1. A process for the production of ethylene which comprises contacting a mixture of ethane, hydrogen chloride and oxygen in a mole ratio in the range from about 1:0.5:0.2 to about 1:2:1 with a siliceous material at a temperature above about 400° C.

2. A process for the production of ethylene which comprises contacting a mixture of ethane, hydrogen chloride and oxygen in a mole ratio in the range from about 1:0.5:0.2 to about 1:2:1 with a siliceous material at a temperature within the range from about 500° C. to about 650° C.

3. A process for the production of ethylene which comprises contacting a mixture of ethane, hydrogen chloride and oxygen in a mole ratio in the range from about 1:0.5:0.2 to about 1:2:1 with a catalyst selected from the group consisting of sand, diatomaceous earth, silica gel, iron silicate, iron silicate supported on silica gel, pumice and garnet at a temperature above about 400° C.

4. A process for the production of ethylene which comprises contacting a mixture of ethane, hydrogen chloride and oxygen in a mole ratio in the range from about 1:0.5:0.2 to about 1:2:1 with a catalyst selected from the group consisting of sand, diatomaceous earth, silica gel, iron silicate, iron silicate supported on silica gel, pumice and garnet at a temperature within the range from about 500° to about 650° C.

5. A process for the production of ethylene which comprises contacting ethane, hydrogen chloride and oxygen in a mole ratio of about 1:1:0.5 with iron silicate at a temperature of about 550° C.

6. A process for the production of ethylene which comprises contacting ethane, hydrogen chloride and oxygen in a mole ratio of about 1:1:0.3 with a catalyst consisting essentially of from about 1% to about 15% by weight of iron silicate supported upon silica gel at a temperature from about 550° to about 600° C.

7. A process for the production of ethylene which comprises contacting ethane, hydrogen chloride and oxygen in a mole ratio of about 1:1:0.3 with garnet at a temperature from about 550° to about 600° C.

8. A process for the production of ethylene which comprises contacting ethane, hydrogen chloride and oxygen in a mole ratio of 1:1:0.5 with pumice at a temperature from about 500° to about 650° C.

9. A process for the production of ethylene which comprises contacting ethane, hydrogen chloride and oxygen in a mole ratio of about 1:1:0.5 with sand at a temperature from about 550° to about 600° C.

10. A process for the production of ethylene which comprises contacting ethane, hydrogen chloride, and oxygen in a mole ratio of about 1:1:0.5 with diatomaceous earth at a temperature from about 550° to about 600° C.

11. A process for the production of ethylene which comprises contacting ethane, hydrogen chloride and oxygen in a mole ratio of about 1:1:0.5 with silica gel at a temperature from about 550° to about 600° C.

12. A process for the production of ethylene which comprises passing ethane, hydrogen chloride and oxygen in a mole ratio of 1:1:0.5 through a fluidized bed of iron silicate maintained at a temperature of about 550° C. by introducing hydrogen chloride admixed with oxygen into the bottom of said bed while injecting ethane into said bed at a point which is from about 5% to about 20% of the reactor length above the bottom of said bed.

13. A process for the production of ethylene which comprises passing ethane, hydrogen chloride and oxygen in a mole ratio of 1:1:0.3 through a fluidized bed of a catalyst consisting essentially of from about 1% to about 15% by weight of iron silicate supported on silica gel maintained at a temperature from about 550° to about 600° C. by introducing hydrogen chloride admixed with oxygen into the bottom of said bed while injecting ethane into said bed at a point which is from about 5% to about 20% of the reactor length above the bottom of said bed.

14. A process for the production of ethylene which comprises passing ethane, hydrogen chloride and oxygen in a mole ratio of 1:1:0.3 through a fluidized bed of garnet maintained at a temperature from about 550° to about 600° C. by introducing hydrogen chloride admixed with oxygen into the bottom of said bed while injecting ethane into said bed at a point which is from about 5% to about 20% of the reactor length above the bottom of said bed.

15. A process for the production of ethylene which comprises passing ethane, hydrogen chloride and oxygen in a mole ratio of 1:1:0.5 through a fluidized bed of pumice maintained at a temperature from about 500° to about 650° C. by introducing hydrogen chloride admixed with oxygen into the bottom of said bed while injecting ethane into said bed at a point which is from about 5% to about 20% of the reactor length above the bottom of said bed.

16. A process for the production of ethylene which comprises passing ethane, hydrogen chloride and oxygen in a mole ratio of 1:1:0.5 through a fluidized bed of sand maintained at a temperature from about 550° to about 600° C. by introducing hydrogen chloride admixed with oxygen into the bottom of said bed while injecting ethane into said bed at a point which is from about 5% to about 20% of the reactor length above the bottom of said bed.

17. A process for the production of ethylene which comprises passing ethane, hydrogen chloride and oxygen in a mole ratio of 1:1:0.5 through a fluidized bed of diatomaceous earth maintained at a temperature from about 550° to about 600° C. by introducing hydrogen chloride admixed with oxygen into the bottom of said bed while injecting ethane into said bed at a point which is from about 5% to about 20% of the reactor length above the bottom of said bed.

18. A process for the production of ethylene which comprises passing ethane, hydrogen chloride and oxygen in a mole ratio of 1:1:0.5 through a fluidized bed of silica gel maintained at a temperature from about 550° to about 600° C. by introducing hydrogen chloride admixed with oxygen into the bottom of said bed while injecting ethane into said bed at a point which is from about 5% to about 20% of the reactor length above the bottom of said bed.

References Cited by the Examiner
UNITED STATES PATENTS

| | | | |
|---|---|---|---|
| 2,397,638 | 4/1946 | Bell et al. | 260—683 |
| 2,921,101 | 1/1960 | Magovern | 260—680 |
| 3,207,806 | 9/1965 | Bajars | 260—680 |

DELBERT E. GANTZ, *Primary Examiner.*

G. E. SCHMITKONS, *Assistant Examiner.*